J. D. DOTY.
DRINKING FOUNTAIN.
APPLICATION FILED APR. 8, 1914.

1,180,987.  
Patented Apr. 25, 1916.

Witnesses  
Frederick W. Ely.  
V. B. Hillyard.

Inventor  
John D. Doty,  
By Victor J. Evans  
Attorney

UNITED STATES PATENT OFFICE.

JOHN D. DOTY, OF MELROSE, NEW YORK.

DRINKING-FOUNTAIN.

1,180,987. Specification of Letters Patent. Patented Apr. 25, 1916.

Application filed April 8, 1914. Serial No. 830,505.

*To all whom it may concern:*

Be it known that I, JOHN D. DOTY, a citizen of the United States, residing at Melrose, in the county of Rensselaer and State of New York, have invented new and useful Improvements in Drinking-Fountains, of which the following is a specification.

The invention has for its object to provide means for supplying stock with drinking water and which prevents such stock from fouling the water and excludes foreign matter from entering the device and contaminating and otherwise rendering the water unfit for drinking purposes.

Specifically considered the invention provides a fountain, for poultry, of such construction as to prevent the fountain from being overturned or the poultry from entering the water container and rendering the water unfit for drinking purposes by washing the soil from their feet therein.

A further purpose of the invention is the provision of a fountain having a cover which when in place is made secure and which fully protects the fountain while at the same time admitting of the poultry having free access to the water for drinking purposes solely, said cover being provided with openings through which the head of the poultry only may be projected and such openings being provided with hoods to prevent foreign matter passing through such openings and fouling the water.

The invention consists of the novel features, details of construction and combination of parts which hereinafter will be more particularly set forth, illustrated and claimed.

Figure 1:
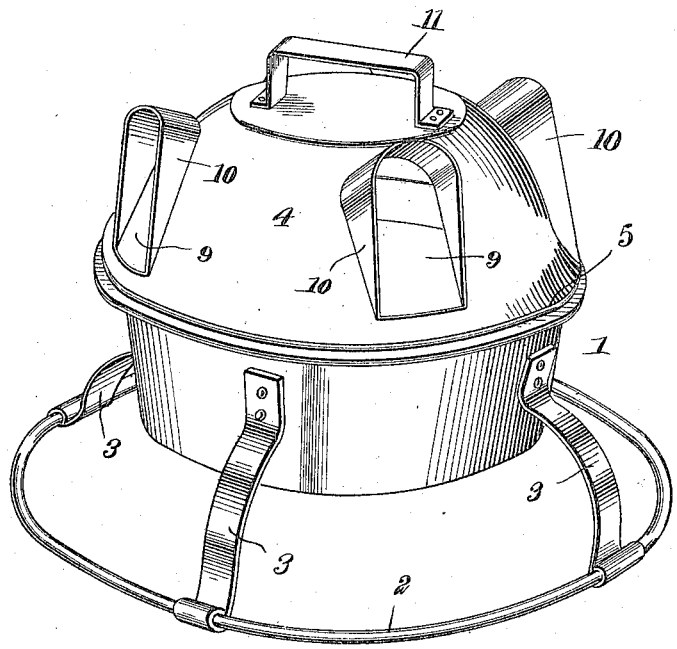
Figures 2, 3:
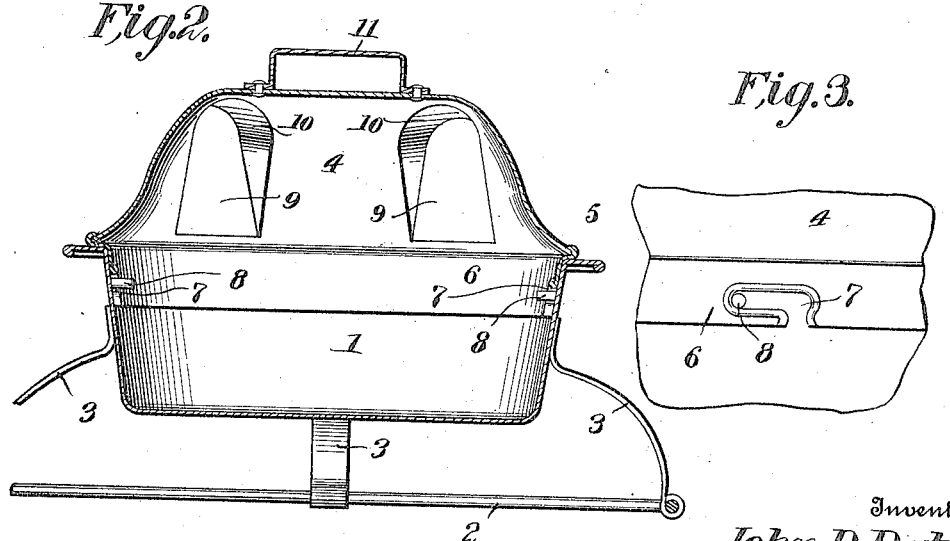

In the drawings hereto attached:—Figure 1 is a perspective view of a drinking fountain embodying the invention. Fig. 2 is a vertical central section. Fig. 3 is a detail view showing the locking means between the cover and fountain.

Corresponding and like parts are referred to in the following description, and indicated in all the views of the drawing, by the same reference characters.

The numeral 1 designates the fountain proper which consists of a pan or receptacle, the same being of any capacity, form and construction. A stand supports the fountain and comprises a ring 2 and braces 3. The ring 2 is of larger diameter than the fountain so as to provide an extended base to prevent the possible tipping of the fountain and the spilling of the water contained therein. The seat of the ring 2 also assists materially in giving stability to the fountain so as to prevent the overturning thereof. The braces 3 are attached at their upper ends to the sides of the fountain and at their lower ends to the ring, the fountain being thereby spaced above the ground and thereby preventing corrosion or rusting of the pan when the ground is wet, and also saving the pan from being dented or otherwise injured when being set down on the ground.

The fountain is closed at its top by means of a cover 4, the same being of dome shape and having an outer flange 5 near its lower edge to overlap the upper portion of the fountain and support the cover thereon. A rim 6 depends from the lower edge of the cover 4 and is adapted to enter the fountain 1 and prevent lateral displacement of the cover. Bayonet slots 7 are formed in the rim 6 and coöperate with studs 8 projecting inward from the sides of the fountain to lock the cover when in proper position upon the fountain. The slot 7 and the studs 8 are so arranged that when the cover member 4 is assembled with the pan or receptacle 1 and the cover member is turned about its vertical axis to a point where the studs 8 will abut on the inner end walls of the slots 7, the hoods 10 will be positioned intermediate the braces 3 so that the chicks seeking access to the fount will not be obstructed by the said braces. After the cover has been placed in position it is given a partial rotation to cause the studs 8 to enter the closed ends of the bayonet slots 7 thereby preventing the removal of the cover by an upward movement. The cover is released by turning the same to bring the open ends of the bayonet slots in register with the studs 8, after which the cover may be lifted from the fountain. A plurality of openings 9 are formed in the sides of the cover and such openings are of a size to admit of the head of chickens or like fowl passing through such openings in order to reach the water contained in the fountain, when the poultry desires to quench its thirst. Owing to the dome-shape of the cover member 4 it is obvious that each slot or opening 9 will be disposed in an inclined plane, the lower portion of the slot being relatively near the edge of the fountain and, therefore, readily available to the fowls. Hoods 10 extend over and along the sides of the openings 9 and serve to prevent foreign matter from entering the fountain through the openings. These hoods may consist of flanges of sheet metal, said flanges being tapered at the sides thereof downwardly toward the lower edges of the respective slots. These hoods, while preventing the admission of dirt and impurities, will in no wise interfere with the free access of the fowls to the water contained in the fountain. While the openings 9 admit of the fowl having free access to the water in the fountain for drinking they wholly prevent the fowl from entering the fountain and contaminating the water by the soil adhering to the feet. For convenience a handle 11 is attached to the top of the cover for manipulating the same when required.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

In a poultry fountain, a receptacle of substantially circular shape, a base ring of a diameter materially exceeding that of the receptacle, braces connecting the ring with the receptacle and supporting the latter above the ground, a dome-shaped cover, said cover and receptacle being provided, respectively, with bayonet slots and with studs engaging the same, said dome having openings in the side walls thereof, each of said openings being positioned in an inclined plane with its lower edge relatively near the edge of the receptacle, and hoods secured adjacent to the openings, each hood consisting of a flange which is tapered downwardly in the direction of the lower edge of the opening protected thereby, the parts being so arranged that when the receptacle and the cover member are assembled the hoods will be positioned above and intermediate the braces that support the receptacle.

In testimony whereof I affix my signature in presence of two witnesses.

JOHN D. DOTY.

Witnesses:
IRENE E. TRIMBLE,
JENNIE D. FITZPATRICK.

Copies of this patent may be obtained for five cents each, by addressing the "Commissioner of Patents, Washington, D. C."